United States Patent [19]

Jun

[11] Patent Number: 5,150,684
[45] Date of Patent: Sep. 29, 1992

[54] HIGH PRESSURE FUEL INJECTION UNIT FOR ENGINE

[75] Inventor: Taue Jun, Iwata, Japan

[73] Assignee: Yamaha Hatsudoki Kabushiki Kaisha, Iwata, Japan

[21] Appl. No.: 632,911

[22] Filed: Dec. 21, 1990

[30] Foreign Application Priority Data

Dec. 25, 1989 [JP] Japan .................... 1-336929

[51] Int. Cl.⁵ .......................... F02M 39/00
[52] U.S. Cl. ........................ 123/446; 123/447; 123/496
[58] Field of Search ............... 123/502, 501, 500, 497, 123/499, 457, 446, 496, 467, 458, 459; 239/88-95

[56] References Cited

U.S. PATENT DOCUMENTS

| 1,865,099 | 6/1932 | Groff | 123/500 |
|---|---|---|---|
| 3,822,677 | 7/1974 | Reddy | 123/497 |
| 4,462,368 | 7/1984 | Funada | 123/446 |
| 4,478,196 | 10/1984 | Hafner | 123/496 |
| 4,545,352 | 10/1985 | Jourde | 123/458 |
| 4,566,416 | 1/1986 | Berchtold | 123/458 |
| 4,669,429 | 6/1987 | Nishida | 123/458 |
| 4,699,109 | 10/1987 | Hensel | 123/458 |
| 4,784,101 | 11/1988 | Iwanaga | 123/467 |
| 4,884,545 | 12/1989 | Mathis | 123/446 |

FOREIGN PATENT DOCUMENTS

| 2441061 | 6/1980 | France . |
|---|---|---|
| 1448567 | 9/1976 | United Kingdom . |
| 2052794 | 1/1981 | United Kingdom . |

Primary Examiner—Carl S. Miller
Attorney, Agent, or Firm—Ernest A. Beutler

[57] ABSTRACT

An accumulator type fuel injector and method of operating it wherein the injection timing is held substantially constant relative to output shaft angle beginning of the range of 5° before top dead center to top dead center and is closed within the range of 25° to 35° after top dead center and wherein the amount of fuel injected is controlled primarily by varying the pressure of the fuel delivered to the accumulator chamber. Various valve lift characteristics may be employed with conjunction with the invention.

20 Claims, 3 Drawing Sheets

Low speed-Low load

Low speed-High load

High speed-Low load

High speed-High load

HIGH PRESSURE FUEL INJECTION UNIT FOR ENGINE

BACKGROUND OF THE INVENTION

This invention relates to a high pressure fuel injector unit for an engine and more particularly to an improved injection unit and method of operating it to insure that there will be good performance under all speed conditions without knocking or other objectionable engine characteristics and good exhaust control.

The use of fuel injectors to improve engine combustion is well known. A fuel injector generally employs a more accurate fuel control and hence will accommodate better engine performance including greater power, better fuel economy, and improved exhaust emission control. One popular type of fuel injector is the so-called "accumulator type". With this type of injector, fuel is supplied under pressure to an accumulator chamber and an injection valve is opened and closed in order to discharge fuel under pressure from the accumulator chamber into the engine. The injection valve is opened and closed by varying the pressure within a control chamber which control chamber receives fuel under pressure from the accumulator chamber.

Despite the advantages of the accumulator type fuel injector, there still can be some problems in providing adequate fuel and the appropriate timing therefore under all running conditions. This is particularly true when the injector is used in conjunction with an engine operating on the diesel cycle.

The control chamber is normally depressurized by opening a control valve that is solenoid operated and hence the opening and closing of the injector valve is related to the energization of the solenoid. Obviously, the amount of fuel injected will determine the speed and load capabilities of the engine. Normally, the speed of the engine increases or the load or power output of the engine increases as the amount of fuel injected increases. However, if the amount of fuel discharged is controlled solely by controlling the duty cycle of the solenoid, certain problems can occur. This is because of the fact that if injection is started too early in the cycle, there is a likelihood of pre-ignition or knocking and also excess NOX emissions. If, however, the injections carries over too long after top dead center, HC and CO emissions will be present in the exhaust gases and fuel comsumption can rise abruptly.

If the amount of fuel is controlled solely by the duty cycle, than a high accumulator pressure is required to insure that all fuel necessary for high performance can be injected into the engine without causing the aforenoted deleterious affects of too early and too late injection. On the other hand, such high pressure gives rises to further problems when the engine operates at low speeds since the duty cycle becomes extremely short and optimum timing is also not possible.

It is, therefore, a principal object of this invention to provide an improved accumulator type fuel injector and method of operating it.

It is another object to this invention to provide an improved arrangement for controlling the speed and output of an injected engine without causing undo emissions of NOX, HC or CO, or knocking, or poor fuel economy.

SUMMARY OF THE INVENTION

This invention is adapted to be embodied in an accumulator type of fuel injector that is comprised of an accumulator chamber that is adapted to be supplied with high pressure fuel. A nozzle port leads from the accumulator chamber and injector valve is moveable between a closed position and an opened position for controlling the discharge of fuel from the accumulator chamber through the nozzle port. A control chamber receives pressurized fuel and an actuating member supported for movement within the control chamber and is associated with the injector valve for retaining the injector valve in its closed position when the control chamber is pressurized and for movement of the injector valve to its opened position when the pressure is relieved in the control chamber. Relief valve means are moveable between a closed position for maintaining pressure in the control chamber and an opened position for relieving control chamber pressure for effecting fuel discharge through the nozzle port. Means are provided for actuating the relief valve between its opened and closed positions with substantially uniform timing of opening and closing throughout the entire engine load and speed ranges. The amount of fuel discharged is controlled by varying the pressure within the accumulator chamber.

A further feature of the invention is adapted to be embodied in a method of operating a fuel injected engine. This invention is adapted to be embodied in an accumulator type of fuel injector that is comprised of an accumulator chamber that is adapted to be supplied with high pressure fuel. A nozzle port leads from the accumulator chamber and injector valve is moveable between a closed position and an opened position for controlling the discharge of fuel from the accumulator chamber through the nozzle port. A control chamber receives pressurized fuel and an actuating member supported for movement within the control chamber and is associated with. the injector valve for retaining the injector valve in its closed position when the control chamber is pressurized and for movement of the injector valve to its opened position when the pressure is relieved in the control chamber. Relief valve means are moveable between a closed position for maintaining pressure in the control chamber and an opened position for relieving control chamber pressure for effecting fuel discharge through the nozzle port. Means are provided for actuating the relief valve between its opened and closed positions with substantially uniform timing of opening and closing throughout the entire engine load and speed ranges. The amount of fuel discharged is controlled by varying the pressure within the accumulator chamber.

DETAILED DESCRIPTION OF THE PREFERRED EMBODIMENTS OF THE INVENTION

Figure 1:
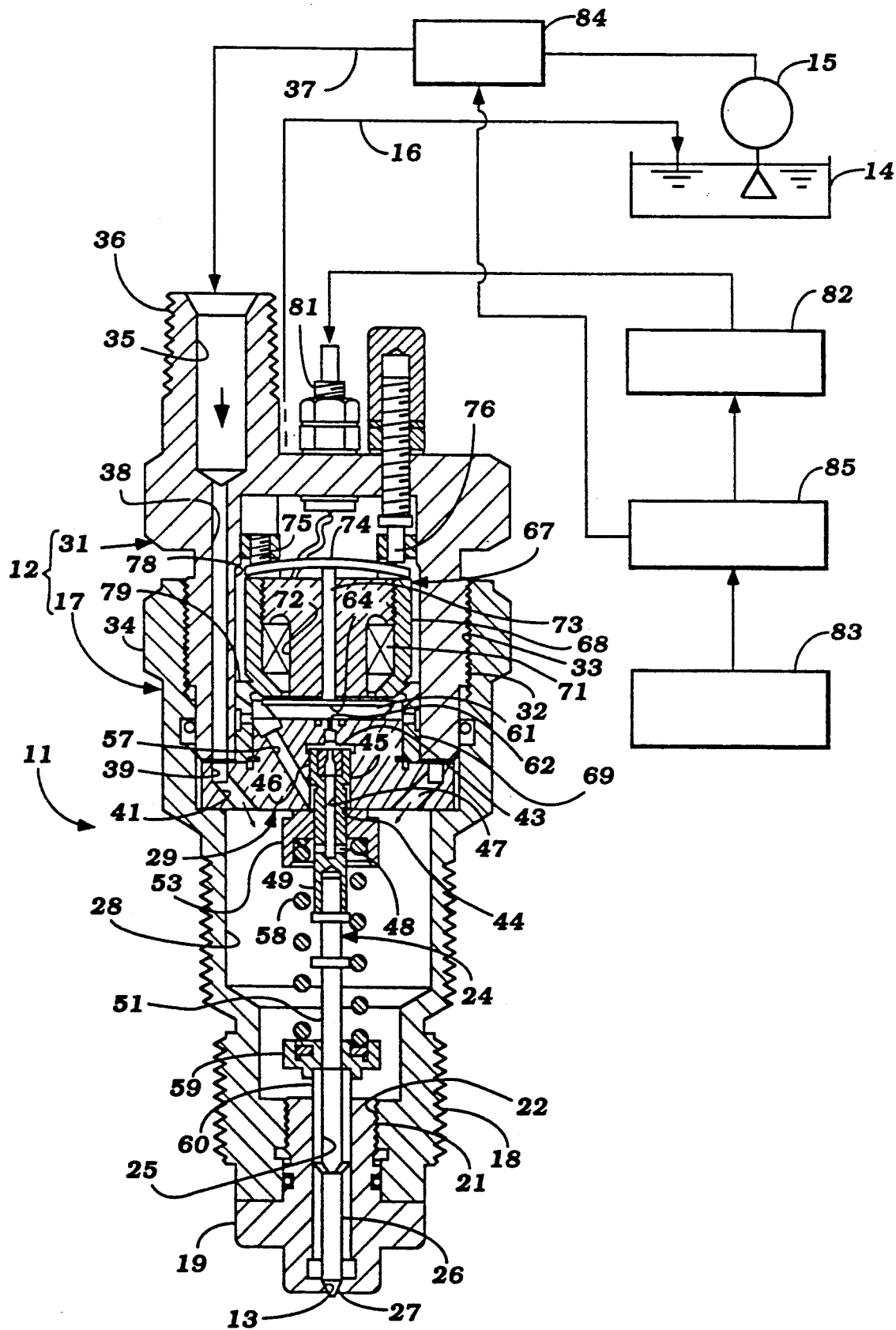
FIG. 1 is a partially schematic cross sectional view taken through a fuel injector constructed and operated in accordance with an embodiment of the invention, with certain of the control elements shown in block form.

Referring to FIG. 1, a fuel injection nozzle constructed and operated in accordance with an embodiment of the invention is identified generally by the reference numeral 11. The injection nozzle 11 is comprised of an outer housing assembly, indicated generally by the reference numeral 12 that is adapted to be mounted, in a manner to be described, in the cylinder head of an internal combustion engine with a nozzle port 13 communicating with the combustion chamber for delivering fuel to it in such a manner to be described. Rather than direct cylinder injection, the invention may be utilized in conjunction with manifold injection systems but the invention has particular utility with direct injection, for example as used with high speed diesel engines.

Fuel is supplied to the injection nozzle 11 from a remotely positioned fuel tank 14 by means of a high pressure pump 15. Excess fuel is returned back to the reservoir 15 through a return line 16. The fuel delivery and return systems will be described in more detail later.

The outer housing 12 is comprised of a lower piece 17 that has a threaded lower end 18 that is adapted to be threaded into a suitable aperture in the cylinder head of the associated engine (not shown) in a known manner. The nozzle port 13 is defined by a tip 19 that has a threaded portion 21 that is received in a threaded bore 22 formed at the lower end of the housing piece 17. An adjusting shim (not shown) may be interposed between the nozzle piece 19 and housing 17 for length adjustment.

An injection valve 24 is slidably supported within a bore 25 of the nozzle piece 19 and has a reduced diameter portion 26 and a flow controlling tip 27 which, in the closed position, closes the injection nozzle port 13. The valve portion 26 has interrupted enlargements for slidably supporting the injection valve 24 in the bore 25 in a known manner.

An accumulator chamber 28 is formed above the bore 25 by the housing piece 17. The accumulator chamber 28 is closed at its upper end by means of a closure plate 29 that is held against a shoulder in the housing piece 17 by a second housing piece 31. The housing piece 31 has a threaded portion 32 that is received within a threaded bore 33 of the housing piece 17 so as to hold the closure plate 29 in position and maintain the chamber 28 in a sealed condition, except as in hereinafter noted. Externally of the threaded opening 33, the housing piece 17 is formed with a hexagonal portion 34 so as to facilitate its insertion into the threaded bore of the cylinder head.

The housing piece 31 is formed with an inlet conduit 35 that has a threaded external portion 36 so as to receive a fitting for connecting a supply line 37 extending from the pressure pump 15 to the inlet conduit 35.

The inlet conduit 35, which is generally a drilled opening, is intersected by a further drilled passageway 38 that extends axially along the housing piece 31 at one side thereof and which communicates at its lower end with a corresponding circumferential groove 39 formed in the upper face of the closure plate 29. The groove 39 is intersected by a passage 41 which delivers fuel under pressure to the accumulator chamber 28.

A control chamber 43 is formed in the closure plate 29 by means of a bore 44 that extends toward the lower end of the closure plate 29. The injection valve 24 has a large diameter generally cylindrical actuator portion 45 that is slidably supported within the bore 44 and which closes the lower end of the control chamber 43. A restricted orifice 46 fixed in the end of the actuator portion 45 communicates an axial passage 47 of the portion 45 and radial port 48 with the accumulator chamber 28. The control chamber 43 communicates with the orifice 46 to receive the pressurized fluid and normally urge the injection valve 24 toward its downward or closed position.

The enlarged diameter portion 45 of the injector valve 24 is adjacent a portion 49 of a diameter that is smaller than the diameter of the portion 45 but which is larger in diameter than a shank portion 51 of the injection valve 24.

A supporting member, indicating generally by the reference numeral 53 and which may have a generally annular shape, is engaged with the underside of the closure plate 29 and has a bore which receives the injection valve portion 49 so as to provide sliding support for it. The supporting member 53 may move transversely to accommodate alignment and, at the same time, sealingly engage the closure plate 29 below the enlarged diameter portion 45. This area is vented to return pressure through a return line 57 so that the higher pressure acting in the control chamber 43 will be sufficient to hold the injection valve 24 in its closed position due to the different forces provided for by the smaller effective area of the portion 49 from the portion 45. As a result, the pressure in the control chamber 43 is, by itself, sufficient to maintain the injection valve 26 in a seated position within the nozzle port 43.

Even though this pressure sealing may be adequate, if desired, a coil compression spring 58 may be provided that encircles the injection valve 24 and bears against the support member 53 at its upper end. The lower end of the spring 58 engages a cup shaped retainer 59 that is held axially in position against a shoulder formed by an enlargement 60 on the injection valve 24 so as to further assist in maintaining the injection valve 24 in the closed position as shown in the drawings. The spring 58 also holds the supporting plate 53 in sealing relation with the portion of the closure plate 29 surrounding the bore 44.

A relief valve 61 is supported within the upper end of the closure plate 29 and controls the opening of a relief valve seat 62 formed in the upper end of the closure plate 29 and communicating with the control chamber 43. The relief valve 61 forms a portion of an enlarged disk like armature plate 64. The relief valve 61 is biased toward its closed position with the valve seat 62 in a manner to be described.

The relief valve 61 when opened will permit the fuel in the control chamber 43 to return to the tank 14 through a return fitting (not shown) that extends axially through the end of the housing piece 31 parallel to the inlet passageway 35. The return fitting communicates with the conduit 16. Fuel can flow from the relief valve seat 62 through return passageway through suitable internal passageways or clearances to permit this return flow, which is relatively small in volume.

The relief valve 61 is opened and closed so as to control the discharge of fuel from the nozzle port 13 by means of an electromagnetic solenoid assembly, indicated generally by the reference numeral 67. This electromagnetic assembly 67 includes a generally cylindrical yoke 68 that has a threaded opening at an enlarged diameter lower end portion 69 which is received on a threaded portion of the closure plate 29 so as to secure the electromagnetic assembly 67 in position.

The electromagnetic assembly 67 is comprised of a solenoid coil of winding 71 that is disposed at the lower end of the housing or yoke 68 and which encircles an armature 72. The armature 72 is formed with a bore that slidably supports an extension 73 of the relief valve.

A leaf spring 74 engages the extension 73 of the relief valve 61 and is loaded by means of a pair of screws 75 and 76 so as to control the pre-load on this spring 74. The spring 74 acts to maintain the relief valve 61 in its closed position.

The yoke 68 of the electromagnet 67 has an upper portion which is also cylindrical in shape but which is reduced in diameter from the mounting portion 69 and is of substantially lesser diameter than the bore of the housing piece 31 in which it is received. This provides a clearance 78 which will prevent the transmission of stray flux paths to the housing 12.

The yoke parts 69 and 77 are connected to each other by means of an intermediate part 79 that extends radially inwardly in proximity to the lower end of the winding 71 and immediately above the armature 64 of the relief valve 61 This provides a concentrated flux path between the armature 72 of the electromagnet 67 and the armature 64 of the relief valve 61. In order to reduce the transmission of flux to the housing piece 31, the intermediate portion 79 is provided with weakened or reduced portions that interconnect it to the remaining components so as to provide the aforenoted result.

A circuit is provided for energizing the coil 71 of the electromagnet assembly 67 for opening and closing the relief valve 61. This circuit includes a pair of terminal posts 81 (only one of which appears in the drawings) that extend through the upper end of the housing piece 31.

The terminals 81 are connected to a driver 82 which, in turn, receives a number of input signals from a variety of sensors, shown schematically at 83, which can be sensors for such things as engine speed, throttle opening, water temperature, oil temperature, fuel temperature, etc.

Rather than varying substantially the duty cycle of the solenoid 67 and particularly its winding 71 to control the amount of fuel discharged, there is provided a fuel pressure regulator 84 in the conduit 37 between the pressure pump 15 and the inlet fitting 35. The pressure regulator 84 is capable of adjusting the regulated pressure delivered to the accumulator chamber 28 and is controlled by a control 85 which, also, receives signals from the sensors 83 in addition to the driver 82.

Figure 2:
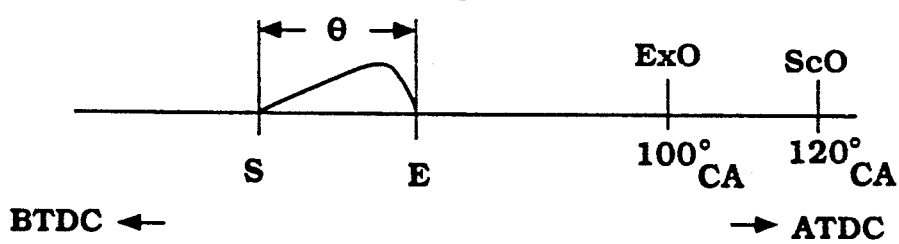
FIG. 2 is a curve showing the operation o lift of the injector valve in relation to crank angle when operating on a two cycle principal.
Figure 3:
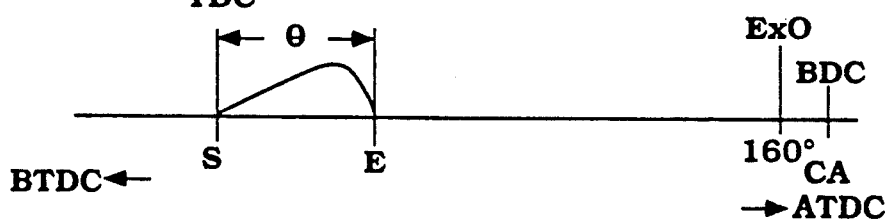
FIG. 3 is a comparable curve showing the operation on a four cycle principal.

FIGS. 2 and 3 show the typical duty cycle in two and four cycle engines, respectively. The solenoid 67 is actuated at a point S approximately a fixed angle before top dead center which angle ranges from 0° to 5° before top dead center. This angle is chosen because it is late enough to insure against knocking and the generation of large amounts of NOX in the exhaust system and also improve fuel consumption. The solenoid 67 is deenergized at the point E, which is at approximately a fixed crank angle after top dead center in the range of about 25° to 35°. This angle is chosen because it will insure against the large amounts of HC and CO in the exhaust gases and also insure against excess fuel comsumption. A fixed timing angle exists between the opening S and closing E.

As may be seen in FIG. 3, the lift characteristics of the injection valve 24 are such that the valve opens slowly to a peak and then closes rapidly so as to have a generally triangular configuration.

Figure 4:
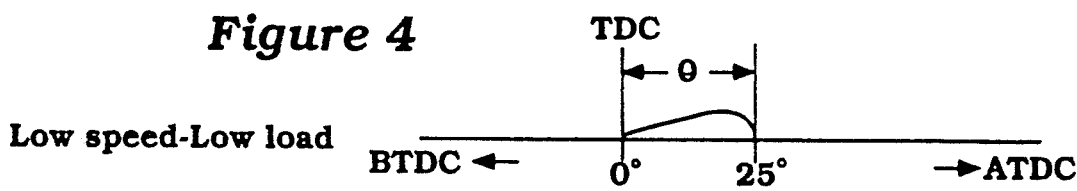
FIGS. 4 through 7 are curves showing the operation of the injector valve under the conditions, respectively, of low speed, low load; low speed, high load; high speed, low load; and high speed, high load.

FIG. 4 shows the normal valve actuation under low speed, low load condition. Under this condition, the injection timing occurs at approximately top dead center and terminates at a approximately 25° after top dead center. If the load is higher, the fuel pressure is increased and the duration of injection is increased slightly by beginning injection approximately 2° before top dead center and terminating at 30° after top dead center.

Figure 5:
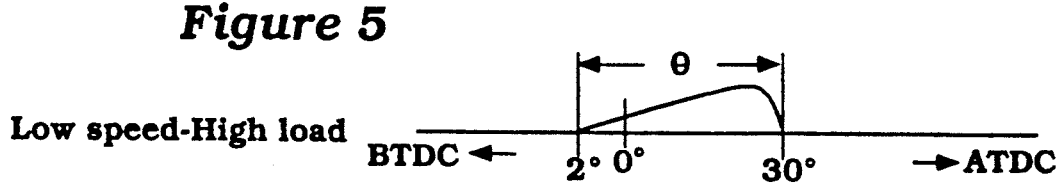
Figure 6:
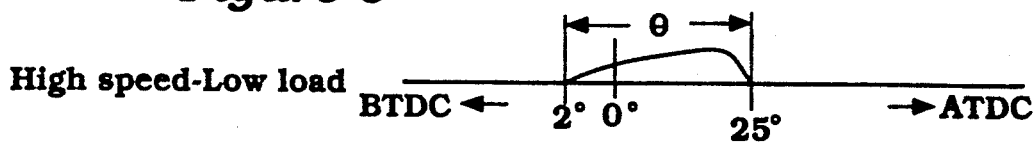

Substantially the same timing curve as the high speed, high load condition (FIG. 5) is used for the high speed, low load condition (FIG. 6). However, injection closing is accelerated to 25° before top dead center and fuel pressure will be increased.

Figure 7:
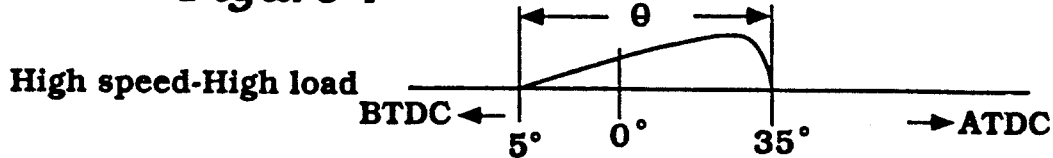

At maximum load (FIG. 7) injection is begun at approximately 5° before top dead center and is terminated at approximately 35° after top dead center. Again, the fuel pressure of the regulator 84 is increased.

Therefore, it should be readily apparent by the aforenoted description that the engine speed and load capability can be varied primarily through the regulation of fuel pressure with only small changes in the timing of injection beginning and ending with engines operating on either the two or four cycle principle. Injection beginning always occurs in the range of 5° to 0° before top dead center and concludes in the range of 25° to 35° after top dead center and thus avoids the deleterious effects aforenoted.

In FIGS. 2 and 3, the exhaust valve or exhaust port openings are indicated at EXO while the scavenge port opening in the case of the two cycle engine is indicated at SCO.

Figure 8:
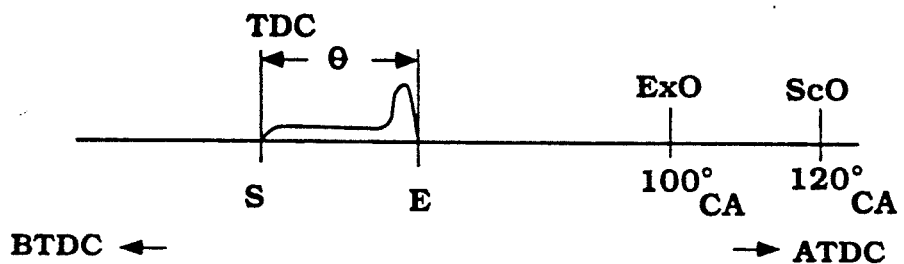
FIG. 8 is a graphical view, in part similar to FIG. 2, showing another embodiment of the invention in conjunction with a two cycle operation.
Figure 9:
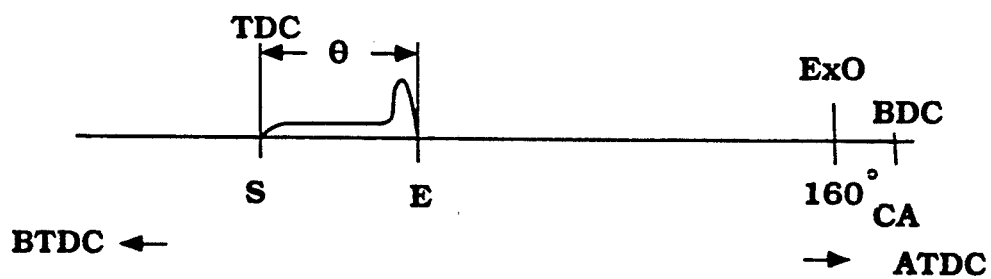
FIG. 9 is a graphical view, in part similar to FIG. 8, showing the operating of this embodiment with a four cycle application.

In the embodiment thus far described, the operation of the accumulator type injector follows a somewhat triangular configuration. By the use of a stopper member to control the rate of opening of the injection valve 24, however, the curves may be varied as shown in FIGS. 8 and 9 wherein the lift of the valve is relatively small once the solenoid is first energized S up until almost the point before closing. This will permit the amount of fuel injected at the beginning of the cycle to be reduced and still further improve the performance.

It should be readily apparent from the foregoing descriptions, that the embodiments of the invention are particularly adapted in insuring good fuel control of an accumulator type injector while maintaining the desired performance throughout the entire engine load and speed ranges. Of course, the foregoing description is that of preferred embodiments of the invention and various changes and modifications may be made without departing from the spirit and scope of the invention, as defined by the appended claims.

I claim:

1. An accumulator type of fuel injection nozzle comprised of an accumulator chamber adapted to be supplied with high pressure fuel, a nozzle port leading from said accumulator chamber, an injector valve moveable between a closed position and an opened position for controlling the discharge of fuel from said accumulator chamber through said nozzle port, a control chamber for receiving pressurized fuel, an actuating member supported for movement within said control chamber and associated with said injector valve for retaining said injector valve in its closed position when said control chamber is pressurized and for movement of said injector valve to its opened position when pressure is relieved in said control chamber, and relief valve means moveable between a closed position for maintaining pressure in said control chamber and an opened position for relieving said control chamber for effecting fuel discharge through said nozzle port, the improvement comprising means for opening the relief valve at a substantially fixed output shaft angle of the associated engine which does not vary by more than about 5° regardless of the engine running condition, and closing the control valve at an approximately fixed output shaft angle which does not vary by more than about 10° regardless of the engine running condition, and means for varying the fuel pressure delivered to the accumulator chamber to vary the output of the engine.

2. An accumulator type of fuel injection nozzle as set forth in claim 1 wherein the control valve is opened in the range of from 5° before top dead center to top dead center.

3. An accumulator type of fuel injection nozzle as set forth in claim 1 wherein the control valve is closed in the range of from 25° to 35° after top dead center.

4. An accumulator type of fuel injection nozzle as set forth in claim 3 wherein the control valve is opened in the range of from 5° before top dead center to top dead center.

5. An accumulator type of fuel injection nozzle as set forth in claim 4 wherein the point of control valve opening is varied within the noted range in response to varying load conditions.

6. An accumulator type of fuel injection nozzle as set forth in claim 4 wherein the point of closing of the control valve is varied in response to varying load conditions within the aforenoted range.

7. An accumulator type of fuel injection nozzle as set forth in claim 6 wherein the point of control valve opening is varied within the noted range in response to varying load conditions.

8. A method of operating an accumulator type of fuel injection nozzle comprised of an accumulator chamber adapted to be supplied with high pressure fuel, a nozzle port leading from the accumulator chamber, an injector valve moveable between a closed position and an opened position for controlling the discharge of fuel from the accumulator chamber through the nozzle port, a control chamber for receiving pressurized fuel, an actuating member supported for movement within the control chamber and associated with the injector valve for retaining the injector valve in its closed position when the control chamber is pressurized and for movement of the injector valve to its opened position when pressure is relieved in said control chamber, and relief valve means moveable between a closed position for maintaining pressure in the control chamber and an opened position for relieving the control chamber for effecting fuel discharge through the nozzle port, the method comprising the steps of opening the relief valve at a substantially fixed output shaft angle of the associated engine which does not vary by more than about 5° regardless of the engine running condition, closing the control valve at an approximately fixed output shaft angle which does not vary by more than about 10° regardless of the engine running condition, and varying the fuel pressure delivered to the accumulator chamber to vary the output of the engine.

9. The method of operating an accumulator type of fuel injection nozzle as set forth in claim 8 wherein the control valve is opened in the range of from 5° before top dead center to top dead center.

10. The method of operating an accumulator type of fuel injection nozzle as set forth in claim 8 wherein the control valve is closed in the range of from 25° to 35° after top dead center.

11. The method of operating an accumulator type of fuel injection nozzle as set forth in claim 10 wherein the control valve is opened in the range of from 5° before top dead center to top dead center.

12. The method of operating an accumulator type of fuel injection nozzle as set forth in claim 11 wherein the point of control valve opening is varied within the noted range in response to varying load conditions.

13. The method of operating an accumulator type of fuel injection nozzle as set forth in claim 11 wherein the point of closing of the control valve is varied in response to varying load conditions within the aforenoted range.

14. The method of operating an accumulator type of fuel injection nozzle as set forth in claim 13 wherein the point of control valve opening is varied within the noted range in response to varying load conditions.

15. An accumulator type of fuel injection nozzle as set forth in claim 1 wherein the engine operates on a diesel cycle.

16. An accumulator type of fuel injection nozzle as set forth in claim 2 wherein the engine operates on a diesel cycle.

17. An accumulator type of fuel injection nozzle as set forth in claim 4 wherein the engine operates on a diesel cycle.

18. A method of operating an accumulator type of fuel injection nozzle as set forth in claim 8 wherein the engine operates on a diesel cycle.

19. A method of operating an accumulator type of fuel injection nozzle as set forth in claim 9 wherein the engine operates on a diesel cycle.

20. A method of operating an accumulator type of fuel injection nozzle as set forth in claim 11 wherein the engine operates on a diesel cycle.

* * * * *